(12) United States Patent
Kim

(10) Patent No.: US 7,869,656 B2
(45) Date of Patent: Jan. 11, 2011

(54) STATISTICAL IMAGE PROCESSING SYSTEM AND METHOD FOR IMAGE/NOISE FEATURE DETECTION

(75) Inventor: Yeong-Hwa Kim, Goyang-si (KR)

(73) Assignee: Chung-Ang University Industry Academic Cooperation Foundation, Seoul (KR)

( * ) Notice: Subject to any disclaimer, the term of this patent is extended or adjusted under 35 U.S.C. 154(b) by 1085 days.

(21) Appl. No.: 11/603,252

(22) Filed: Nov. 22, 2006

(65) Prior Publication Data

US 2007/0133872 A1    Jun. 14, 2007

(30) Foreign Application Priority Data

Nov. 30, 2005   (KR) .................... 10-2005-0115811

(51) Int. Cl.
| | |
|---|---|
| G06K 9/46 | (2006.01) |
| G06K 9/66 | (2006.01) |
| G06K 9/00 | (2006.01) |
| G06K 9/48 | (2006.01) |
| G06K 9/62 | (2006.01) |

(52) U.S. Cl. ................ 382/190; 382/181; 382/195; 382/197; 382/199; 382/224; 382/228

(58) Field of Classification Search ....................... None
See application file for complete search history.

(56) References Cited

U.S. PATENT DOCUMENTS

| 4,991,092 A * | 2/1991 | Greensite .................... 382/131 |
| 2003/0179213 A1 * | 9/2003 | Liu .............................. 345/619 |
| 2005/0069223 A1 * | 3/2005 | Tanimura et al. ............ 382/284 |

* cited by examiner

*Primary Examiner*—Anand Bhatnagar
*Assistant Examiner*—Randolph Chu
(74) *Attorney, Agent, or Firm*—Harness, Dickey, & Pierce, P.L.C.

(57) ABSTRACT

A statistical image processing system and method for detecting an original image feature and/or a noise feature in an input image using a statistical hypothesis test, thereby estimating the image or noise when an original image is contaminated with the noise, and a recording medium for recording the method, are provided. The method enables existence/non-existence of an image/noise feature in an input image to be accurately detected without information on the magnitude of a sample variance of noise in the input image. In addition, according to the method, the relative amount of noise and/or image feature can be numerically expressed and can be used in the various fields of image processing application.

20 Claims, 13 Drawing Sheets

FIG. 1
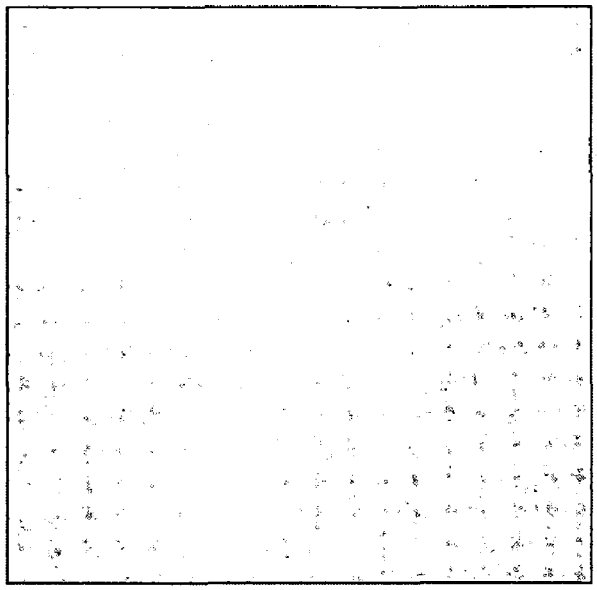
(b) NOISE, VARIANCE=25
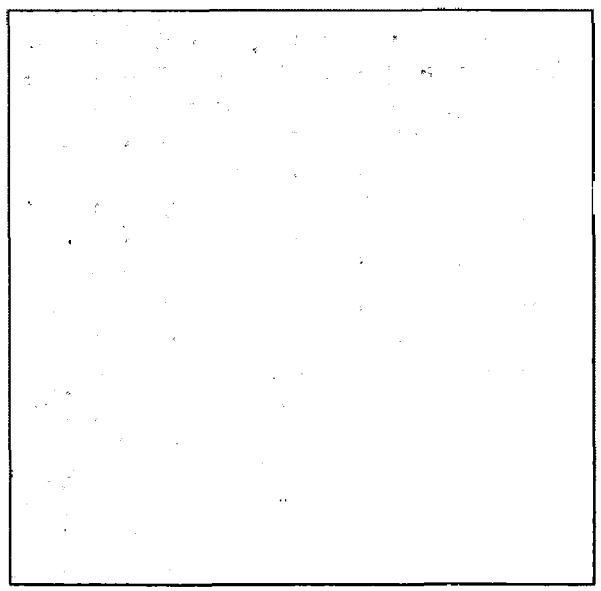
(a) IMAGE, VARIANCE=25

FIG. 2
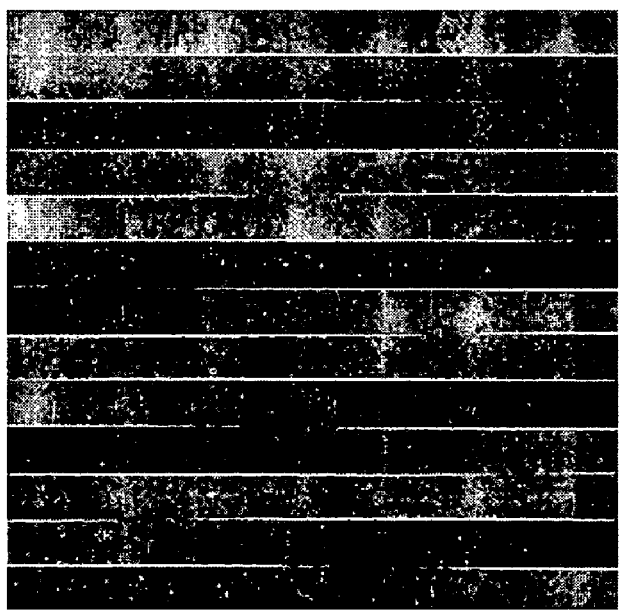
(b) NOISE, VARIANCE=2500
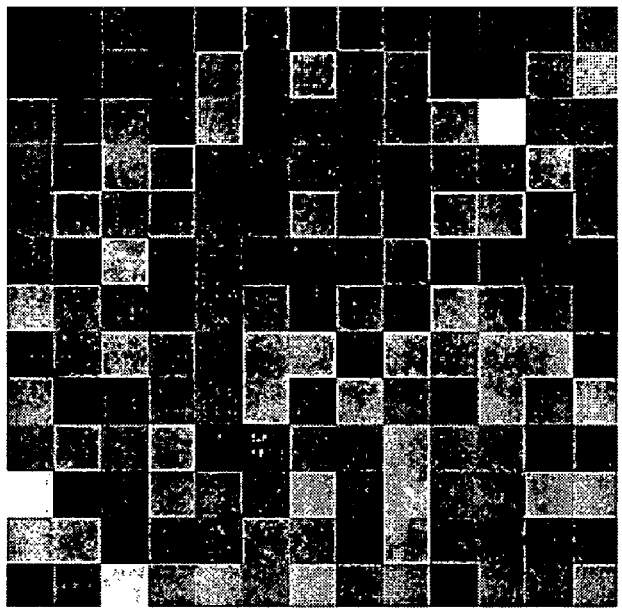
(a) IMAGE, VARIANCE=2500

STATISTICAL IMAGE PROCESSING SYSTEM AND METHOD FOR IMAGE/NOISE FEATURE DETECTION

CROSS-REFERENCE TO RELATED PATENT APPLICATION

This application claims the benefit of Korean Patent Application No. 10-2005-0115811, filed on Nov. 30, 2005, in the Korean Intellectual Property Office, the disclosure of which is incorporated herein in its entirety by reference.

FIELD OF THE INVENTION

The present invention relates to a statistical image processing system and method for image/noise feature detection, and more particularly, to a statistical image processing system and method for detecting an original image feature and/or a noise feature in an input image using a statistical hypothesis test, thereby estimating the image or noise when an original image is contaminated with the noise, and a recording medium for recording the method.

BACKGROUND OF THE INVENTION

Conventionally, a method using a sample variance usually defined in statistics is used in order to detect an original image feature and a noise feature in an input image. In this conventional method, image sample data that has a small sample variance is detected as a noise feature and image sample data that has a large sample variance is detected as an image feature.

Referring to FIG. 1, sample (a) is an enlarged view of a part of an image having a small detail of an original image and having a slight of Gaussian noise while sample (b). is an enlarged view of a part of an image having only Gaussian noise without an image feature. Both of the samples (a) and (b) have similar sample variances of about 25.

Referring to FIG. 2, sample (a) corresponds to an edge while sample (b) shows an image having only Gaussian noise without an image feature. However, both of the samples (a) and (b) have similar sample variances of about 2500.

It can be inferred from samples (a) and (b) illustrated in FIGS. 1 and 2 that there is a limit in detecting an image feature or a noise feature in an input image based on only the value of a sample variance. Moreover, since most image processing application systems do not possess advance information on the variance of noise complying with the Gaussian distribution $N(0, \sigma^2)$, it is difficult to provide coherent results regardless of the value of the variance of noise.

SUMMARY OF THE INVENTION

Some embodiments of the present invention provide a statistical image processing system and method for detecting an image feature and a noise feature in an input image using a statistical hypothesis test and numerically expressing the image feature or the noise feature in the input image using statistical inference to estimate the image feature or a noise feature in each pixel when the input image is contaminated with noise, and a recording medium for recording a program for executing the method on a computer.

Some embodiments of the present invention provide a statistical image processing system and method for applying statistics to existing image processing applications with limit in performance due to inaccurate detection of an image feature and a noise feature, thereby enhancing adaptiveness to noise, and a recording medium for recording a program for executing the method on a computer.

Other embodiments of the present invention provide a method for estimating an image feature and a noise feature in each pixel in an input image, by which the amount of image/noise feature is independently detected using the statistical properties of image data in a portion or a block including a pixel to be estimated.

According to some embodiments of the present invention, there is provided a statistical image processing system for detecting an image/noise feature. The system includes a partial image extraction unit configured to extract a partial image surrounding a particular pixel in an input image, an image correlation estimation unit configured to obtain a direction coherence with respect to each of a plurality of predetermined direction using a correlation between pixel values in the partial image, an independence estimation unit configured to obtain a test statistic by numerically expressing similarity between a plurality of direction coherences obtained by the image correlation estimation unit, and a statistical hypothesis test unit configured to compare the test statistic obtained by the independence estimation unit with at least one predetermined image/noise limit and to obtain an image/noise detection value indicating an amount of image/noise feature in the partial image.

According to other embodiments of the present invention, there is provided a statistical image processing method for detecting an image/noise feature. The method includes extracting a partial image surrounding a particular pixel in an input image, obtaining a direction coherence with respect to each of a plurality of predetermined direction using a correlation between pixel values in the partial image, obtaining a test statistic by numerically expressing similarity between a plurality of direction coherences, and obtaining an image/noise detection value indicating an amount of image/noise feature in the partial image by comparing the test statistic with at least one predetermined image/noise limit.

BRIEF DESCRIPTION OF THE DRAWINGS

The above and other features and advantages of the present invention will become more apparent by describing in detail exemplary embodiments thereof with reference to the attached drawings in which:

FIG. 1 illustrates two samples respectively corresponding to an image feature and a noise feature and having the same variance of 25;

FIG. 2 illustrates two samples respectively corresponding to an image feature and a noise feature and having the same variance of 2500;

DETAILED DESCRIPTION OF THE INVENTION

Figure 3:
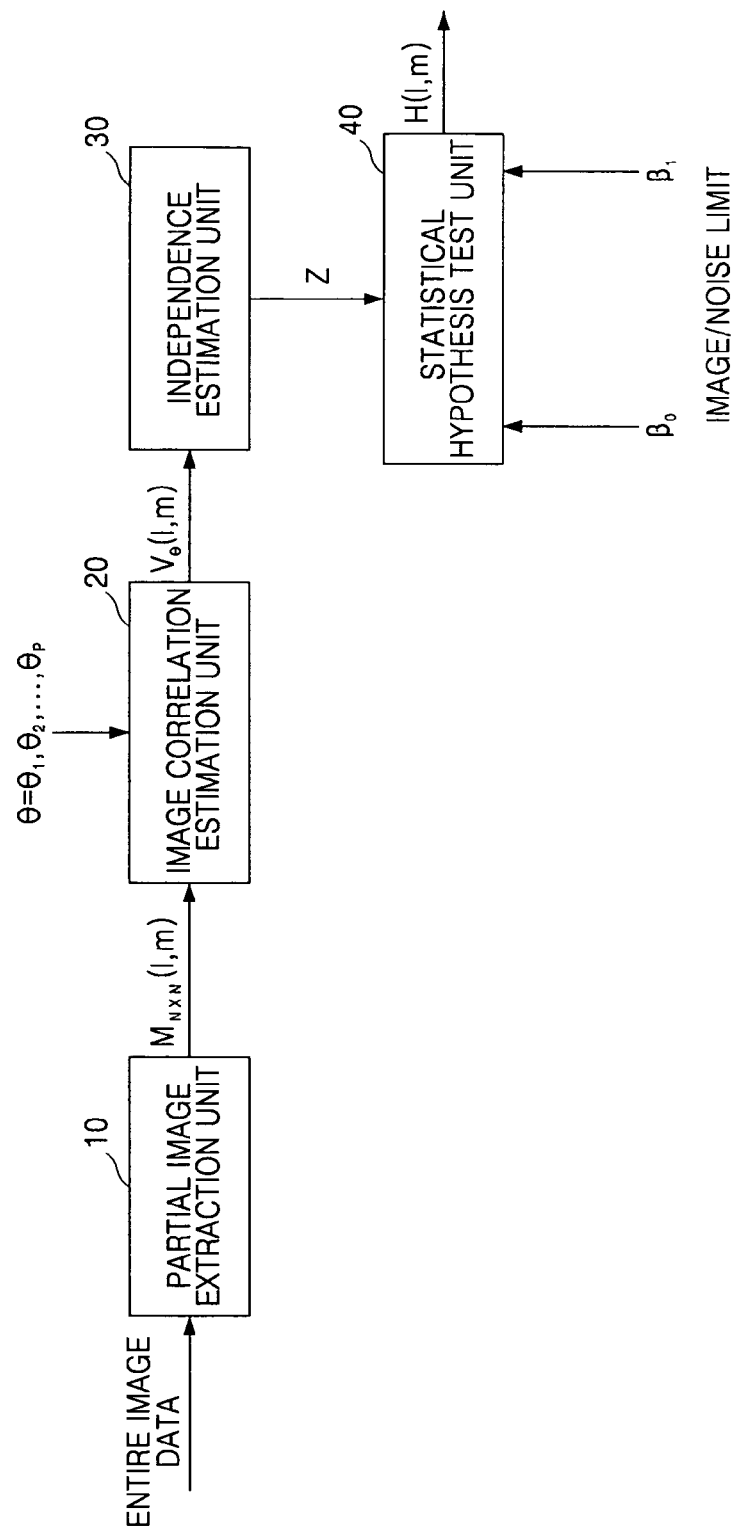
FIG. 3 is a block diagram of a statistical image processing system for detecting an image/noise feature according to some embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

It will be understood that when an element is referred to as being "connected" or "coupled" to another element, it can be directly connected or coupled to the other element or intervening, elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 3 is a block diagram of a statistical image processing system for detecting an image/noise feature according to some embodiments of the present invention. Referring to FIG. 3, the image processing system includes a partial image extraction unit 10, an image correlation estimation unit 20, an independence estimation unit 30, and a statistical hypothesis test unit 40.

The partial image extraction unit 10 extracts pixel data of a partial image, and usually, a block image $M_{N \times N}(l,m)$ surrounding a particular pixel, in which an image/noise feature is detected, from an input image, e.g., entire image data.

The image correlation estimation unit 20 defines a direction coherence $V_\theta(l,m)$ indicating the degree of coherence between pixel values with respect to a direction $\theta$ within the partial image $M_{N \times N}(l,m)$ set by the partial image extraction unit 10 and obtains the direction coherence $V_\theta(l,m)$ (where $\theta=\theta_1, \theta_2, \ldots, \theta_p$ and "p" is 2 or an integer greater than 2) with respect to each of a plurality of predetermined directions.

The independence estimation unit 30 obtains a test statistic Z which numerically expresses the similarity between the plurality of direction coherences $V_\theta(l,m)$ obtained by the image correlation estimation unit 20.

The statistical hypothesis test unit 40 compares the test statistic Z obtained by the independence estimation unit 30 with one or more predetermined image/noise limits $\beta_0$ and $\beta_1$ to obtain an image/noise detection value $H(l,m)$ indicating the amount of image/noise feature in the partial image $M_{N \times N}(l,m)$.

Figure 4:
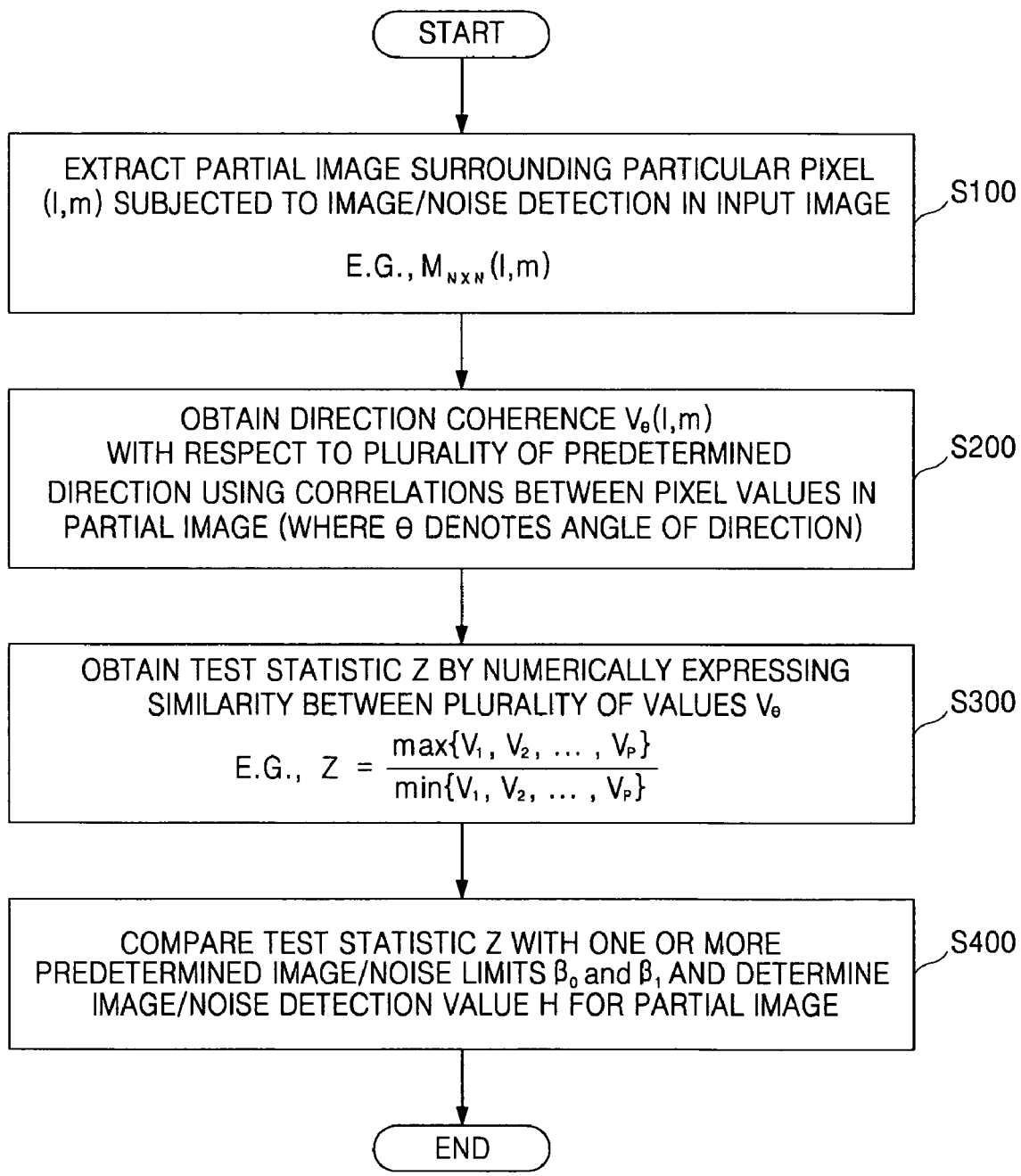
FIG. 4 is a flowchart of a statistical image processing method for detecting an image/noise feature according to some embodiments of the present invention.
Figure 5:
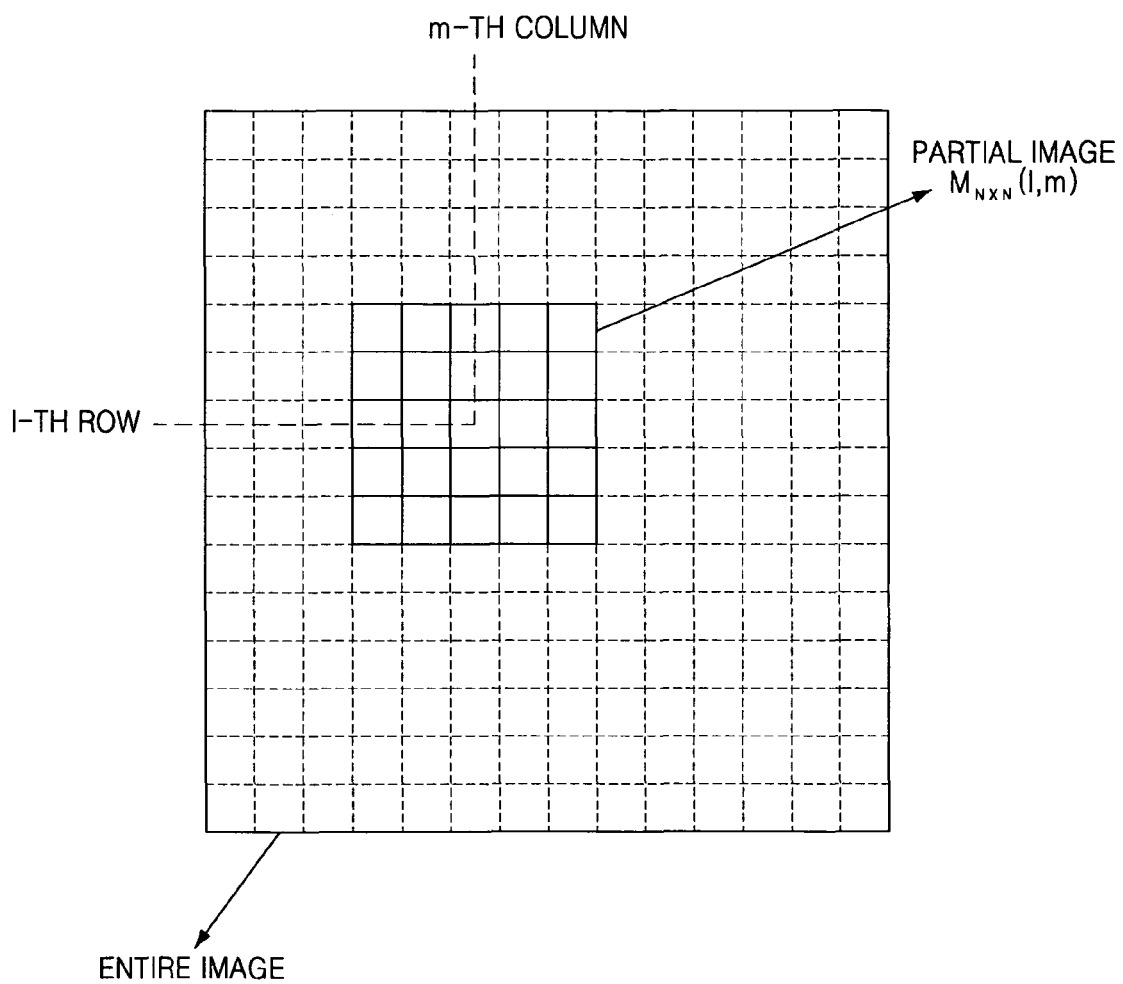
FIG. 5 illustrates the relationship among an entire image, a pixel in which an image/noise feature is detected, and a block image surrounding the pixel in operation S100 in the method illustrated in FIG. 4.

FIG. 4 is a flowchart of a statistical image processing method for detecting an image/noise feature according to some embodiments of the present invention. In operation S100, the partial image extraction unit 10 extracts a pixel value of a partial image, and usually, a block image $M_{N \times N}(l,m)$ surrounding a particular pixel, in which an image/noise feature is detected, from an entire image. At this time, the shape of the partial image may be arbitrarily defined. In FIG. 5, for clarity of the description, the shape of the partial image is defined as an N×N square.

FIG. 5 illustrates the relationship among the entire image, the particular pixel in which an image/noise feature is detected, and the block image $M_{N \times N}(l,m)$ surrounding the particular pixel in operation S100 in the method illustrated in FIG. 4. Referring to FIG. 5, the partial block image $M_{N \times N}(l,m)$ has the shape of a 5×5 square having 5 pixels in length and 5 pixels in width. However, the size of the partial block m ay vary with applications. The particular pixel within the entire image may be represented with coordinates in the entire image. For example, when an upper left corner in the entire image is represented with (1,1), a pixel positioned on an l-th row from the top of the entire image and an m-th column from the left of the entire image is represented with $f(l,m)$. The partial image having the N×N square shape defined on the basis of the particular pixel is represented with $M_{N \times N}(l,m)$. In FIG. 5, the partial image is defined as a 5×5 square on the basis of the particular pixel positioned on the seventh row and the sixth column in the entire image and is thus represented with $M_{5 \times 5}(7,6)$.

Referring back to FIG. 4, in operation S200, the image correlation estimation unit 20 obtains a direction coherence $V_\theta(l,m)$ with respect to each of the plurality of predetermined directions $\theta$ (where $\theta=\theta_1, \theta_2, \ldots, \theta_p$ and "p" is 2 or an integer greater than 2) using correlations between pixel values within the partial image $M_{N \times N}(l,m)$. At this time, the direction coherence $V_\theta(l,m)$ may be redefined by multiplying the direction coherence $V_\theta(l,m)$ by an appropriate constant. Schemes of obtaining the change in a pixel value in a particular direction within the partial image $M_{N \times N}(l,m)$ in order to obtain the direction coherence $V_\theta(l,m)$ are illustrated in FIGS. 6 and 7.

Figure 6:
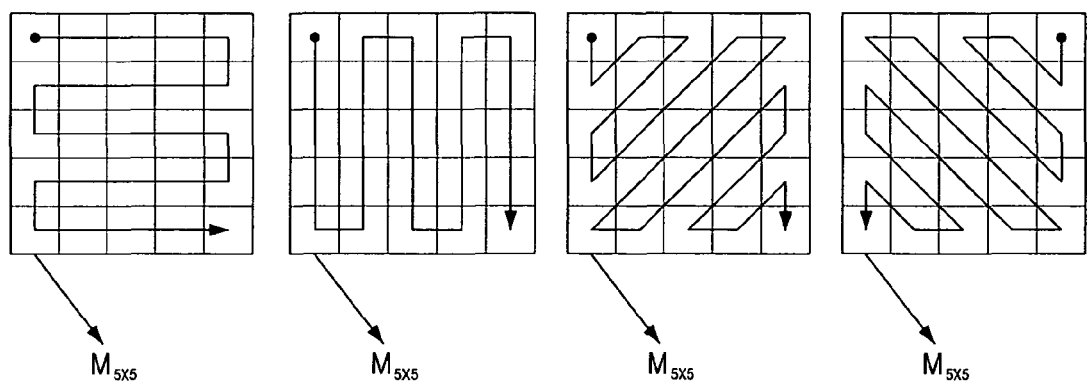
FIG. 6 illustrates four directions in which pixels in an M×N block are rearranged in order to detect a direction coherence of an image in operation S200 in the method illustrated in FIG. 4.
Figure 7:
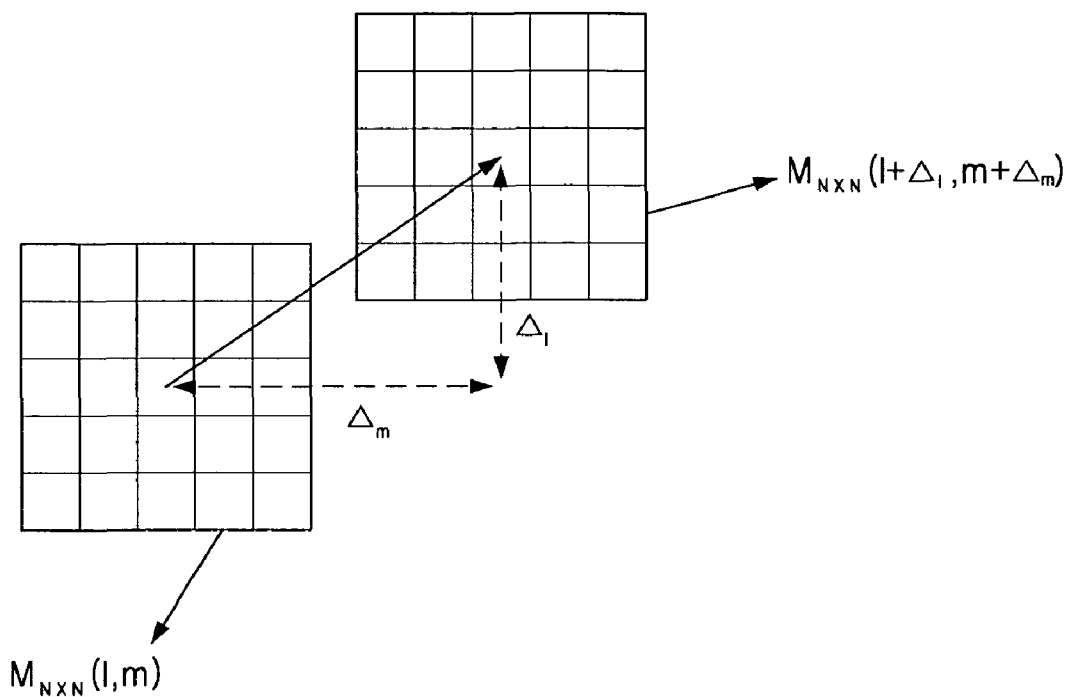
FIG. 7 illustrates a scheme of detecting the direction coherence of an image using a pixel difference between two M×N blocks in operation S200 in the method illustrated in FIG. 4.

FIG. 6 illustrates how pixels within the partial image $M_{N \times N}$(l,m) are rearranged in a given direction in order to define the direction coherence $V_\theta$(l,m) in operation S200 in the method illustrated in FIG. 4. Here, pixels values in the partial image $M_{N \times N}$(l,m) are arranged on a line along a predetermined direction. Thereafter, the direction coherence $V_\theta$(l,m) may be defined based on a function having as a factor a difference $Z_i^\theta$ between adjacent pixel values, which is expressed by $z_i^\theta = u_i^\theta - u_{i-1}^\theta$ or $z_i^\theta = |u_i^\theta - u_{i-1}^\theta|$. For example, the direction coherence $V_\theta$(l,m) may be defined as an average of the function having the difference $Z_i^\theta$ as a factor. Here, "θ" indicates an angle of a direction in which all pixel values in the partial image $M_{N \times N}$(l,m) are read and "$u_i^\theta$" indicates an i-th pixel value when the pixel values in the partial image $M_{N \times N}$(!,m) are sequentially read at the direction angle θ.

Referring to FIG. 6, the pixel values in the partial image $M_{N \times N}$(l,m) may be sequentially read in four directions respectively having angles of 0°, 90°, 45°, and 135° and arranged in a one-dimensional array. Thereafter, differences between adjacent pixel values may be statistically and numerically expressed to obtain a direction coherence $V_\theta$. For example, the direction coherence $V_\theta$ may be defined by Equation (1) or (2).

$$V_\theta = \frac{1}{N^2 - 1} \sum_{i=2}^{N^2} (z_i^\theta)^2 \qquad (1)$$

$$V_\theta = \frac{1}{N^2 - 1} \sum_{i=2}^{N^2} |z_i^\theta| \qquad (2)$$

Here, $z_i^\theta = u_i^\theta - u_{i-1}^\theta$ and "$u_i^\theta$" indicates the i-th pixel value when the pixel values in the partial image $M_{N \times N}$(l,m) are sequentially read at the direction angle θ. A total number of pairs of adjacent two pixels is $N^2 - 1$, and therefore, a total of number of values $z_i^\theta$ is also $N^2 - 1$ from i=2 to i=$N^2$.

When the direction coherence $V_\theta$ is defined by Equation (1), the direction coherence $V_\theta$ has similar values without a significant difference regardless of the direction θ if data in the partial image $M_{N \times N}$(l,m) has a random Gaussian distribution. However, if the data in the partial image $M_{N \times N}$(l,m) has a image feature in a particular direction, $z_i^\theta$ has smaller values in the particular direction than in other directions and the direction coherence $V_\theta$ is also decreased in the particular direction while the direction coherence $V_\theta$ is increased in directions far from the particular direction of the image feature. Accordingly, the direction coherence $V_\theta$ is different according to the direction θ in the partial image $M_{N \times N}$(l,m) including the image feature.

When all pixels in the partial image $M_{N \times N}$(l,m) are arranged in an N×N matrix, the direction coherence $V_\theta$ may be variously defined by, for example, Equations (3), (4), and (5).

$$V_\theta = \frac{1}{N^2 - 1} \sum_{i=2}^{N^2} (z_i^\theta - \bar{z})^2, \bar{z} = \frac{1}{N^2 - 1} \sum_{i=2}^{N^2} z_i^\theta \qquad (3)$$

$$V_\theta = \frac{1}{N^2 - 1} \sum_{i=2}^{N^2} ([z_i^\theta]^2 - \bar{z})^2, \bar{z} = \frac{1}{N^2 - 1} \sum_{i=2}^{N^2} z_i^\theta \qquad (4)$$

$$V_\theta = \frac{1}{N^2 - 1} \sum_{i=2}^{N^2} (|z_i^\theta| - \bar{z})^2, \bar{z} = \frac{1}{N^2 - 1} \sum_{i=2}^{N^2} z_i^\theta \qquad (5)$$

FIG. 7 illustrates another scheme of defining the direction coherence $V_\theta$ of the partial image $M_{N \times N}$(l,m) in operation S200 in the method illustrated in FIG. 4. Referring to FIG. 7, a second partial image $M_{N \times N}$(l+$\Delta_l$,m+$\Delta_m$) apart from the first partial image $M_{N \times N}$(l,m) by a distance of ($\Delta_l$,$\Delta_m$) is defined. Differences between pixels in the first partial image $M_{N \times N}$(l,m) and respective corresponding pixels in the second partial image $M_{N \times N}$(l+$\Delta_l$,m+$\Delta_m$) are statistically and numerically expressed to obtain the direction coherence $V_\theta$. In detail, the direction coherence $V_\theta$ may be defined based on a function having as a factor a pixel difference $z_{i,j}^\theta$ between the first and second partial images. For example, the direction coherence $V_\theta$ may be defined as an average of the function having the pixel difference $z_{ij}^\theta$ as a factor. For example, the direction coherence $V_\theta$ may be defined by Equation (6) or (7).

$$V_\theta(l, m) = \frac{1}{N^2} \sum_{i=1}^{N} \sum_{j=1}^{N} (z_{i,j}^\theta)^2 \qquad (6)$$

$$V_\theta(l, m) = \frac{1}{N^2} \sum_{i=1}^{N} \sum_{j=1}^{N} |z_{i,j}^\theta|. \qquad (7)$$

In addition, when all pixels in the partial image $M_{N \times N}$(l,m) are arranged in an N×N matrix, the direction coherence $V_\theta$ may be variously defined by, for example, Equations (8), (9), and (10).

$$V_\theta(l, m) = \frac{1}{N^2} \sum_{i=1}^{N} \sum_{j=1}^{N} (z_{i,j}^\theta - \bar{z})^2, \bar{z} = \frac{1}{N^2} \sum_{i=1}^{N} \sum_{j=1}^{N} z_{i,j}^\theta \qquad (8)$$

$$V_\theta(l, m) = \frac{1}{N^2} \sum_{i=1}^{N} \sum_{j=1}^{N} ([z_{i,j}^\theta]^2 - \bar{z})^2, \bar{z} = \frac{1}{N^2} \sum_{i=1}^{N} \sum_{j=1}^{N} z_{i,j}^\theta \qquad (9)$$

$$V_\theta(l, m) = \frac{1}{N^2} \sum_{i=1}^{N} \sum_{j=1}^{N} (|z_{i,j}^\theta| - \bar{z})^2, \bar{z} = \frac{1}{N^2} \sum_{i=1}^{N} \sum_{j=1}^{N} z_{i,j}^\theta \qquad (10)$$

Here, "i" and "j" respectively indicate a row and a column in each partial image, θ indicates a direction in which the second partial image $M_{N \times N}$(l+$\Delta_l$,m+$\Delta_m$) is apart from the first partial image $M_{N \times N}$(l,m), and $z_{i,j}^\theta$ indicates a difference between a pixel value on a coordinate position (i,j) in the first partial image $M_{N \times N}$(l,m) and a pixel value on the coordinate position (i,j) in the second partial image $M_{N \times N}$(l+$\Delta_l$,m+$\Delta_m$). The difference $z_{i,j}^\theta$ may be defined by Equations (11) and (12).

$$z_{i,j}^\theta = x_{i,j}(l, m) - x_{i,j}(l + \Delta_l, m + \Delta_m), \theta = \tan^{-1}\left(\frac{\Delta_l}{\Delta_m}\right) \qquad (11)$$

$$z_{i,j}^\theta = |x_{i,j}(l, m) - x_{i,j}(l + \Delta_l, m + \Delta_m)|, \theta = \tan^{-1}\left(\frac{\Delta_l}{\Delta_m}\right) \qquad (12)$$

Like the direction. coherence $V_\theta$ defined by Equation (1), the direction coherence $V_\theta$ defined by Equation (6) has similar values without a significant difference regardless of the direction θ if the data in the partial image $M_{N \times N}(l,m)$ has the random Gaussian distribution. However, if the data in the partial image $M_{N \times N}(l,m)$ has a image feature in a particular direction, $z_{i,j}^\theta$ has smaller values in the particular direction than in other directions and the direction coherence $V_\theta$ is also decreased in the particular direction while the direction coherence $V_\theta$ is increased in directions far from the particular direction of the image feature. Accordingly, the direction coherence $V_\theta$ is different according to the direction θ in the partial image $M_{N \times N}(l,m)$ including the image feature.

The direction coherence $V_\theta$ defined by Equation (6) is easier and more efficient to use for image processing than the direction coherence $V_\theta$ defined by Equation (1). In other words, direction coherences $V_\theta$ with respect to various directions can be more easily obtained according to Equation (6).

In operation S300, the independence estimation unit 30 obtains the test statistic Z which numerically expresses the similarity between the plurality of direction coherences $V_\theta$ obtained in operation S200.

Each of the direction coherences $V_\theta$ obtained in operation S200 is an estimator used to estimate a population parameter from a random sample. The estimator is a single random variable and has unique distribution. The direction coherence $V_\theta$ defined in operation S200 is an unbiased estimator of a variance $\sigma_\theta^2$ of population with respect to the direction θ. The unbiasedness of such point estimator is a desirable characteristic that should be possessed by the estimator in point estimation in statistical inference. However, since a statistic is based on a difference between two samples adjacent in a predetermined direction, it has different values. according to the sequence of arrangement of samples, i.e., orientation θ when pixels in the partial image $M_{N \times N}(l,m)$ have an image feature. Contrarily, when pixels in the partial image $M_{N \times N}(l,m)$ are random noise, statistics $V_\theta$ may have values which do not have a significant difference statistically therebetween regardless of the orientation θ (where $\theta=\theta_1, \theta_2, \ldots, \theta_P$ and "p" is 2 or an integer greater than 2). In detail, when there is no image feature, statistics such as the direction coherence $V_\theta$ (where $\theta=\theta_1, \theta_2, \ldots, \theta_P$) have the same statistical characteristics. In other words, when there is no image feature, the statistics $V_\theta$ (where $\theta=\theta_1, \theta_2, \ldots, \theta_P$) are estimators related with a population variance with respect to data independently extracted from different populations. Accordingly, testing the existence of an image feature usually comes to statistical hypothesis testing for testing the sameness of a population variance among a plurality of independent regular populations. In other words, when values $V_1, V_2, \ldots, V_P$ obtained with respect to the orientations θ (where $\theta=\theta_1, \theta_2, \ldots, \theta_P$) are determined to have a statistically significant difference, it may be concluded that an image feature exists in a given image sample. However, when the values $V_1, V_2, \ldots, V_P$ obtained with respect to the orientations θ (where $\theta=\theta_1, \theta_2, \ldots, \theta_P$) are not determined to have a statistically significant difference, it may be concluded that the given image sample is noise. After all, it becomes the matter of testing the sameness of population variances to statistically find out whether variances of the populations are the same (in a case of random noise) or not (when an image feature exists) using the estimators $V_1, V_2, \ldots, V_P$ of P population variances.

To test the sameness of population variances, it is assumed that variances of regular populations with respect to P directions are respectively represented with $\sigma_1^2, \sigma_2^2, \ldots, \sigma_P^2$. Here, estimators of the variances are $V_1, V_2, \ldots, V_P$. A null hypothesis $H_0$ and an alternative hypothesis $H_1$ for testing the sameness of population variances are defined by Equation (13).

$$H_0: \sigma_1^2 = \sigma_2^2 = \ldots = \sigma_P^2 \text{ v.s. } H_1: \text{not } H_0 \quad (13)$$

The null hypothesis $H_0$ defined by Equation (13) hypothesizes that the variances of the P populations are the same. Accordingly, when the null hypothesis $H_0$ is selected, the same statistical characteristics are shown in P directions. Here, it is determined that an image feature in a particular direction does not exist in a given area. However, when the null hypothesis $H_0$ is rejected, an image feature exists in the particular direction in the given area. However, the result of statistical hypothesis test is different with respect to a significance level, and therefore, it may be very important to determine an appropriate significance level. Accordingly, a statistical testing method of detecting whether a given area does not have an orientation, that is, the given area is a random noise area having the same statistical characteristic in all directions or whether the given area has different statistical characteristics in different directions, that is, the given area includes an image feature can be provided based on the hypotheses defined by Equation (13).

Assuming that the null hypothesis $H_0: \sigma_1^2 = \sigma_2^2 = \ldots = \sigma_P^2$ is correct, various test statistics may be used. For example, a test statistic defied by Equation (14) may be used.

$$Z = \frac{\max\{V_1, V_2, \cdots, V_P\}}{\min\{V_1, V_2, \cdots, V_P\}} \quad (14)$$

Here, $V_1, V_2, \ldots, V_P$ respectively denote direction coherences $V_\theta(l,m)$ (where $\theta=\theta_1, \theta_2, \ldots, \theta_P$) with respect to P directions $\theta_1, \theta_2, \ldots, \theta_P$ (where P is 2 or an integer greater than 2), respectively, in the partial image $M_{N \times N}(l,m)$; $\max\{V_1, V_2, \ldots, V_P\}$ denotes a maximum value of the direction coherences $V_\theta(l,m)$; and $\min\{V_1, V_2, \ldots, V_P\}$ denotes a minimum value of the direction coherences $V_\theta(l,m)$.

Besides the test statistic defined by Equation (14), a test statistic defined by Equation (15) or (16) may also be used.

$$Z = \frac{X_{P-1}}{X_2} \quad (15)$$

$$Z = \frac{X_P + X_{P-1}}{X_1 + X_2} \quad (16)$$

More typically, a test statistic defined by Equation (17) may be used.

$$Z = \frac{X_j}{X_i} \quad (17)$$

In Equations (15) through (17), $X_1$ denotes the first minimum value of the direction coherences $V_\theta(l,m)$ with respect to the P directions $\theta_1, \theta_2, \ldots, \theta_P$ in the partial image $M_{N \times N}(l,m)$, $X_2$ denotes. the second minimum value of them, and $X_i$ denotes the i-th minimum value of them. In this manner, $X_P$ denotes the first maximum value of the direction coherences $V_\theta(l,m)$ and $X_{P-1}$ denotes the second maximum value of them.

In operation S400, the statistical hypothesis test unit 40 compares the test statistic Z obtained in operation S300 with the one or more predetermined image/noise limits $\beta_0$ and $\beta_1$ to obtain the image/noise detection value H(l,m) indicating the amount of image/noise feature in the partial image $M_{N \times N}$(l, m).

In the current embodiment of the present invention, the two image/noise limits $\beta_0$ and $\beta_1$ are used. However, a single image/noise limit or at least three image/noise limits may be used in other embodiments of the present invention.

Operation S400 in the statistical image processing method illustrated in FIG. 4 will be described in detail with reference to FIG. 8 below.

Figure 8:
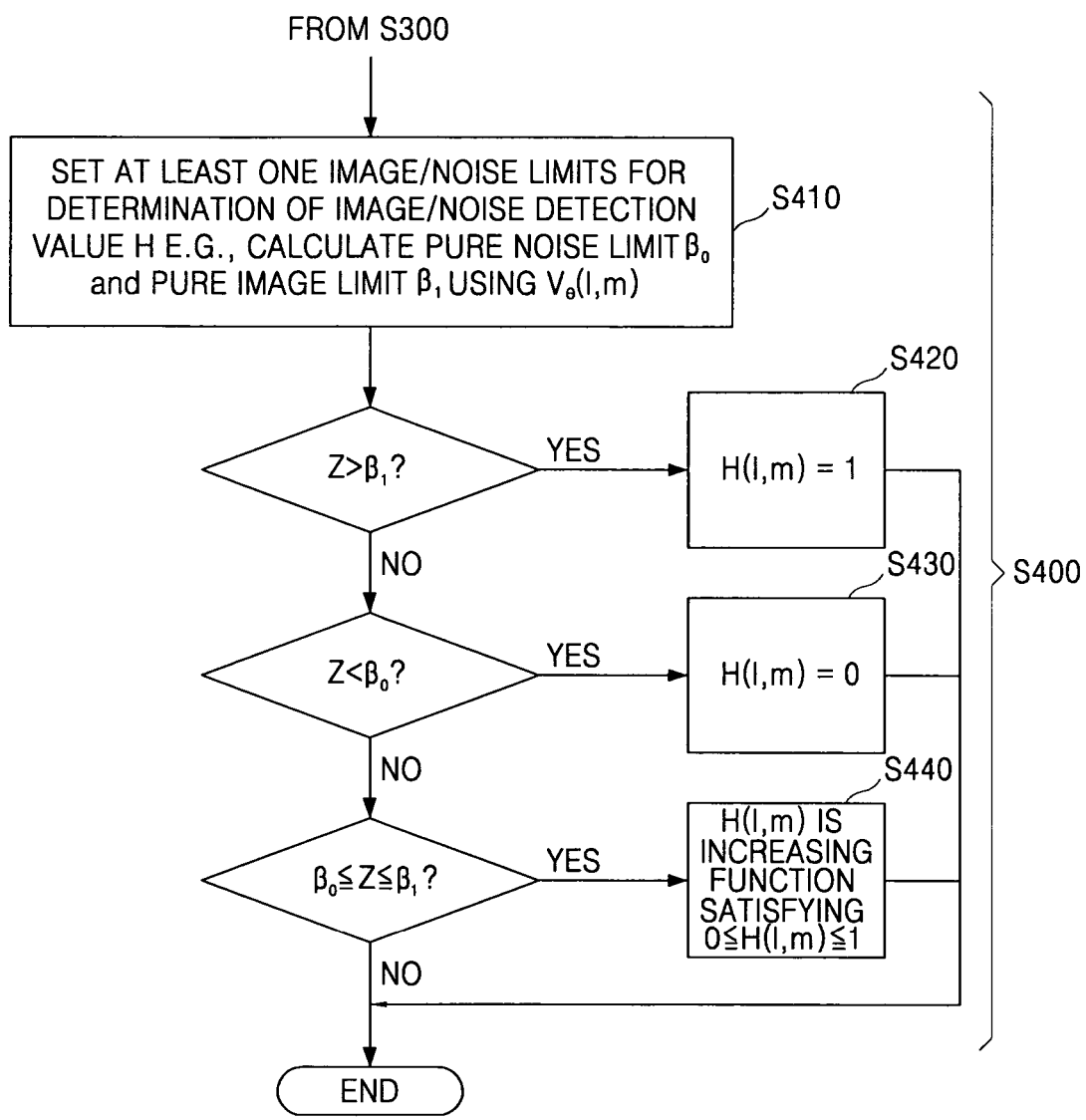
FIG. 8 is a detailed flowchart of operation S400 in the method illustrated in FIG. 4.

Referring to FIG. 8, at least one image/noise limits $\beta_0$ and $\beta_1$ for determination of image/noise detection value H are set in operation S410. When the test statistic Z obtained in operation S300 is at least a first image/noise limit (hereinafter, referred to as a pure image limit $\beta_1$), the image/noise detection value H(l,m) is set to a first setting value (e.g., "1") in operation S420. Here, the pure image limit $\beta_1$ denotes that the image/noise detection value H(l,m) is no longer the first setting value when the test statistic Z is less than a value of $\beta_1$.

Contrarily, when the test statistic Z does not exceed a pure noise limit $\beta_0$, the image/noise detection value H(l,m) is set to a second setting value (e.g., "0") in operation S430. Here, the pure noise limit $\beta_0$ denotes that the image/noise detection value H(l,m) is no longer the second setting value when the test statistic Z is greater than a value of $\beta_0$.

When the test statistic Z is in a range of the pure noise limit $\beta_0$ to the pure image limit $\beta_1$, the image/noise detection value H(l,m) is set to an increasing function of the test statistic Z having a value from the first to the second setting value, e.g., 0 to 1, in operation S440.

In other words, the procedure for obtaining the image/noise detection value H(l,m) using the predetermined pure noise and image limits $\beta_0$ and $\beta_1$ in operation S400, i.e., S410 through S440, may end in one of the following three cases.

In the first case, if $Z > \beta_1$, the null hypothesis $H_0$ is rejected and "unequal variance" is determined. That is, it is determined that an image feature exists.

In the second case, if $Z < \beta_0$, the null hypothesis $H_0$ is selected and "equal variance" is determined. That is, it is determined that an image feature does not exist.

In the third case, if $\beta_0 \leq Z \leq \beta_1$, determination is deferred. Here, intermediary determination is made about the existence/non-existence of an image feature, which will be described with reference to FIGS. 9 through 11.

Figure 9:
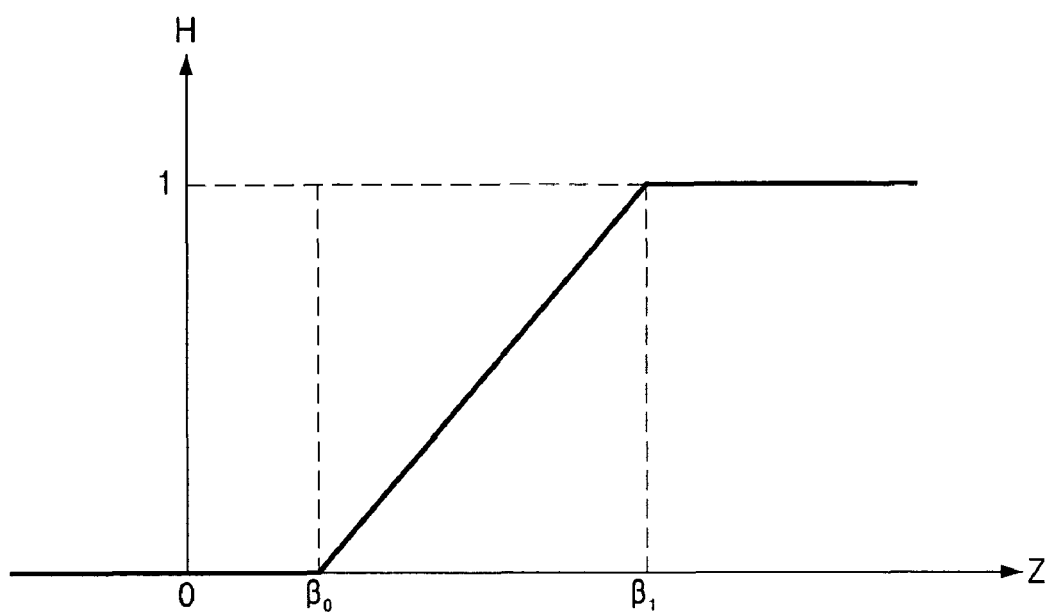
FIG. 9 is a graph of an image/noise detection function according to some embodiments of the present invention.

FIG. 9 is a graph of an image/noise detection function determined in operation S440 according to some embodiments of the present invention. Here, the image/noise detection value H(l,m) is expressed by Equation (18).

$$H(l, m) = \begin{cases} 0, & \text{if } z < \beta_0 \\ \frac{z - \beta_0}{\beta_1 - \beta_0}, & \text{if } \beta_0 \leq z \leq \beta_1 \\ 1, & \text{if } z > \beta_1 \end{cases} \quad (18)$$

Here, H(l,m) denotes an image/noise detection value for a pixel positioned on the l-th row and the m-th column in an entire image, Z denotes a test statistic, $\beta_0$ denotes the pure noise limit, and $\beta_1$ denotes the pure image limit. When the image/noise detection value is expressed by Equation (18), it changes linearly.

Figure 10:
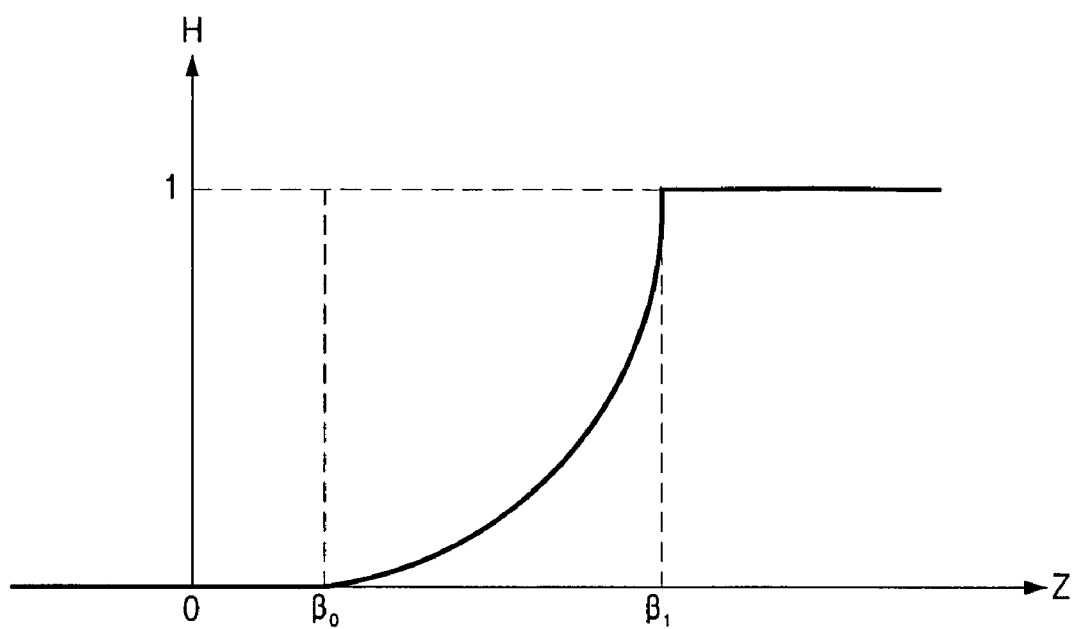
FIG. 10 is a graph of an image/noise detection function according to some embodiments of the present invention.

FIG. 10 is a graph of an image/noise detection function determined in operation S440 according to some embodiments of the present invention. Here, the image/noise detection value H(l,m) is expressed by Equation (19).

$$H(l, m) = \begin{cases} 0, & \text{if } z < \beta_0 \\ \left(\frac{z - \beta_0}{\beta_1 - \beta_0}\right)^2, & \text{if } \beta_0 \leq z \leq \beta_1 \\ 1, & \text{if } z > \beta_1 \end{cases} \quad (19)$$

Here, H(l,m) denotes an image/noise detection value for a pixel positioned on the l-th row and the m-th column in an entire image, Z denotes a test statistic, $\beta_0$ denotes the pure noise limit, and $\beta_1$ denotes the pure image limit. When the image/noise detection value is expressed by Equation (19), it changes slowly first and then changes rapidly.

Figure 11:
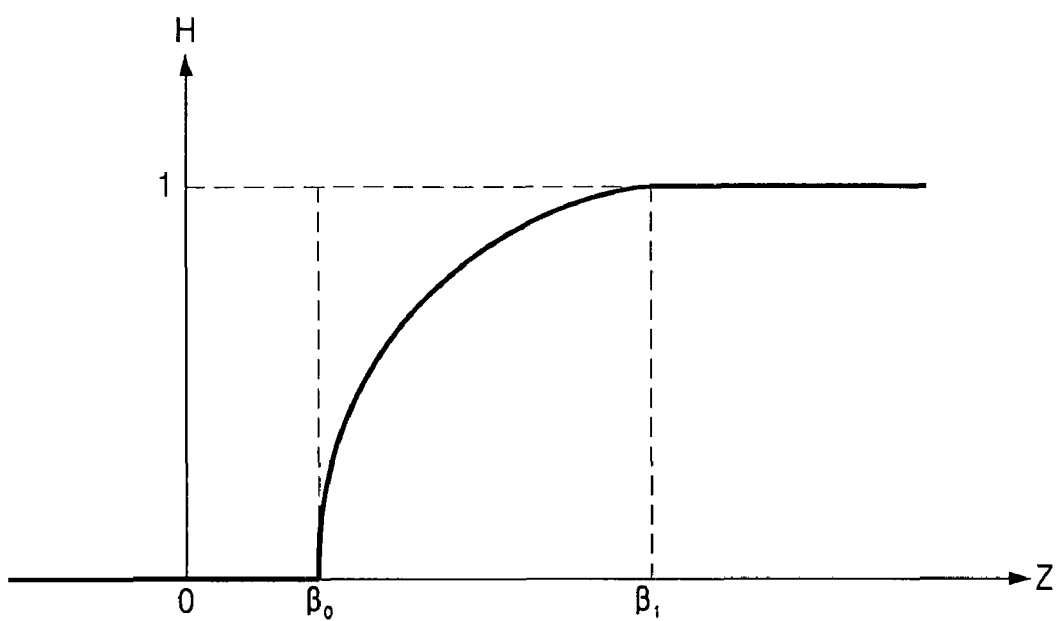
FIG. 11 is a graph of an image/noise detection function according to some embodiments of the present invention.

FIG. 11 is a graph of an image/noise detection function determined in operation S440 according to some embodiments of the present invention. Here, the image/noise detection value H(l,m) is expressed by Equation (20).

$$H(l, m) = \begin{cases} 0, & \text{if } z < \beta_0 \\ 1 - \left(\frac{z - \beta_1}{\beta_1 - \beta_0}\right)^2, & \text{if } \beta_0 \leq z \leq \beta_1 \\ 1, & \text{if } z > \beta_1 \end{cases} \quad (20)$$

Here, H(l,m) denotes an image/noise detection value for a pixel positioned on the l-th row and the m-th column in an entire image, Z denotes a test statistic, $\beta_0$ denotes the pure noise limit, and $\beta_1$ denotes the pure image limit. When the image/noise detection value is expressed by Equation (20), it changes rapidly first and then changes slowly.

Figure 12:
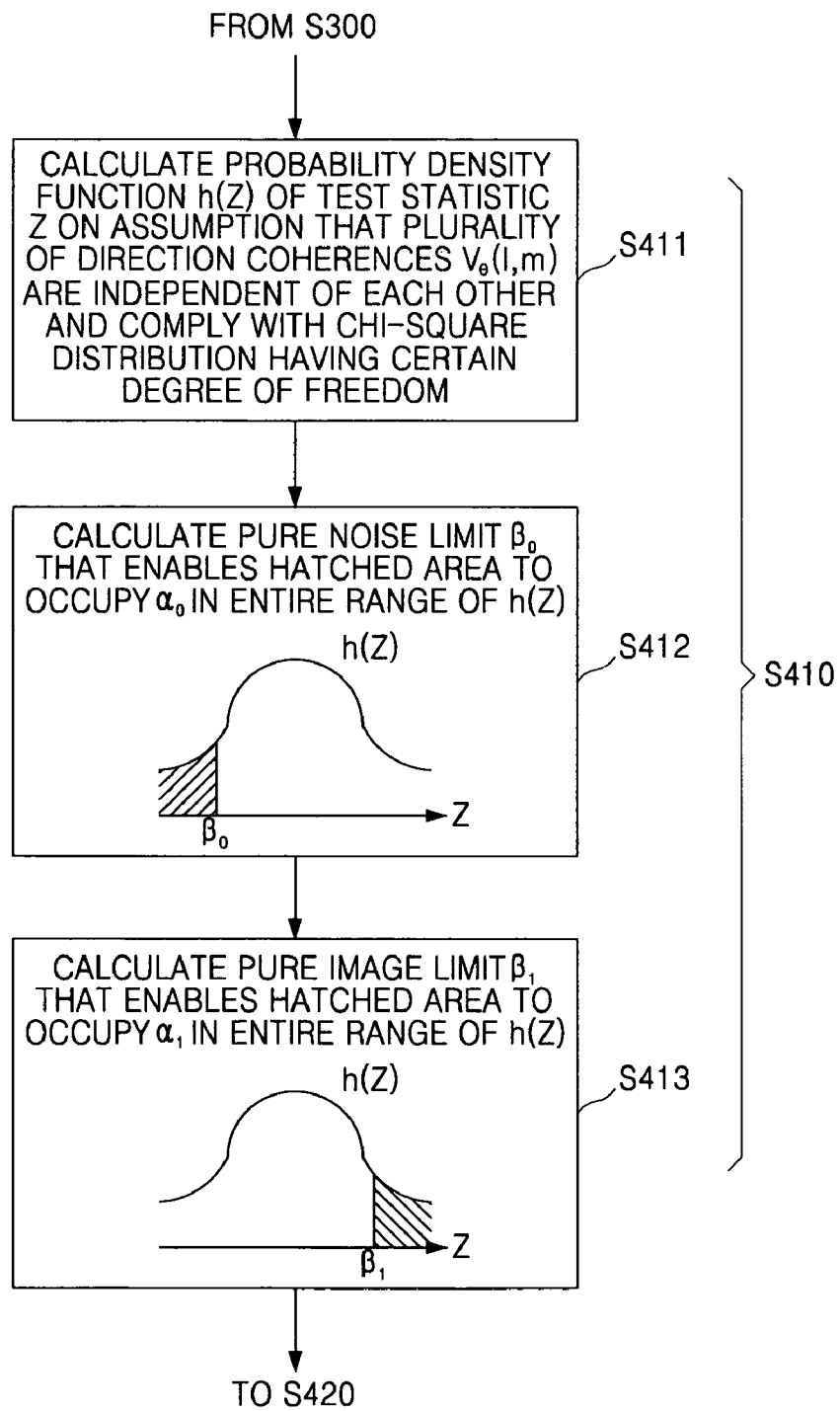
FIG. 12 is a detailed flowchart of a procedure for obtaining two image/noise limits using a direction coherence in the method illustrated in FIG. 4.

FIG. 12 is a detailed flowchart of a procedure for obtaining the two image/noise limits $\beta_0$ and $\beta_1$ using the direction coherence $V_\theta$(l,m) in the method illustrated in FIG. 4. In other words, FIG. 12 illustrates a procedure for calculating the pure noise limit $\beta_0$ and the pure image limit $\beta_1$, which have been described as values predetermined to obtain the image/noise detection value H(l,m) in operation S400. In operation S410, the pure noise limit $\beta_0$ and the pure image limit $\beta_1$ are calculated using significant levels and the direction coherences $V_\theta$(l,m) obtained in operation S200.

Referring to FIG. 12, on the assumption that the plurality of direction coherences $V_\theta$ (where $\theta = \theta_1, \theta_2, \ldots, \theta_P$) are, independent of each other and comply with chi-square distribution having a certain degree of freedom, a probability density function h(z) is obtained with respect to the test statistic Z in operation S411. In a case where $\theta = 1, 2, 3, 4$, that is, when direction coherences $V_1, V_2, V_3,$ and $V_4$ are given, if $V_1, V_2, V_3,$ and $V_4$ are independent of one another and comply with chi-square distribution having the degree of freedom "r" and the test statistic Z is given by Equation (21), the probability density function h(z) of the test statistic Z is defined by Equation (22).

$$Z = \frac{X_4}{X_1} \quad (21)$$

Here, $X_1$ denotes a minimum value among $V_1, V_2, V_3,$ and $V_4$ and $X_4$ denotes a maximum value among $V_1, V_2, V_3,$ and $V_4$.

$$h(z) = \frac{12 z^{\frac{r}{2}-1}}{\Gamma\left(\frac{r}{2}\right)\Gamma\left(\frac{r}{2}\right)2^r} \times \int_0^\infty w^{r-1} e^{-\frac{w(1+z)}{2}} \left[ \int_w^{zw} \frac{t^{\frac{r}{2}-1} e^{-\frac{t}{2}}}{\Gamma\left(\frac{r}{2}\right)2^r} dt \right]^2 dw, \quad (22)$$

$$z \geq 1$$

In operation S412, a value of z, at which a distribution of the probability density function h(z) obtained when the test statistic Z is less than a predetermined value occupies less than a ratio of $\alpha_0$ in an entire range defined by the probability density function h(z), is calculated and set as the pure noise limit $\beta_0$. Referring to a graph illustrated in operation S412, a value of z, at which a hatched area occupies $\alpha_0$ in the entire area between the Z axis and the probability density function h(z), is set as the pure noise limit $\beta_0$. Here, the value of $\alpha_0$ may be a predetermined stationary value or may be changed by a user.

In operation S413, a value of z, at which a distribution of the probability density function h(z) obtained when the test statistic Z is greater than the predetermined value occupies less than a ratio of $\alpha_1$ in the entire range defined by the probability density function h(z), is calculated and set as the pure image limit $\beta_1$. Referring to a graph illustrated in operation S413, a value of z, at which a hatched area occupies $\alpha_1$ in the entire area between the Z axis and the probability density function h(z), is set as the pure image limit $\beta_1$. Here, the value of $\alpha_1$ may be a predetermined stationary value or may be changed by a user.

The image/noise detection value H(l,m) is obtained using the thus calculated pure noise limit $\beta_0$ and the pure image limits $\beta_1$. The image/noise detection value H(l,m) obtained by the above-described procedure may be used for applications in various fields of image processing. The above-described method may be generalized as illustrated in FIG. 13 to be used for image processing.

Figure 13:
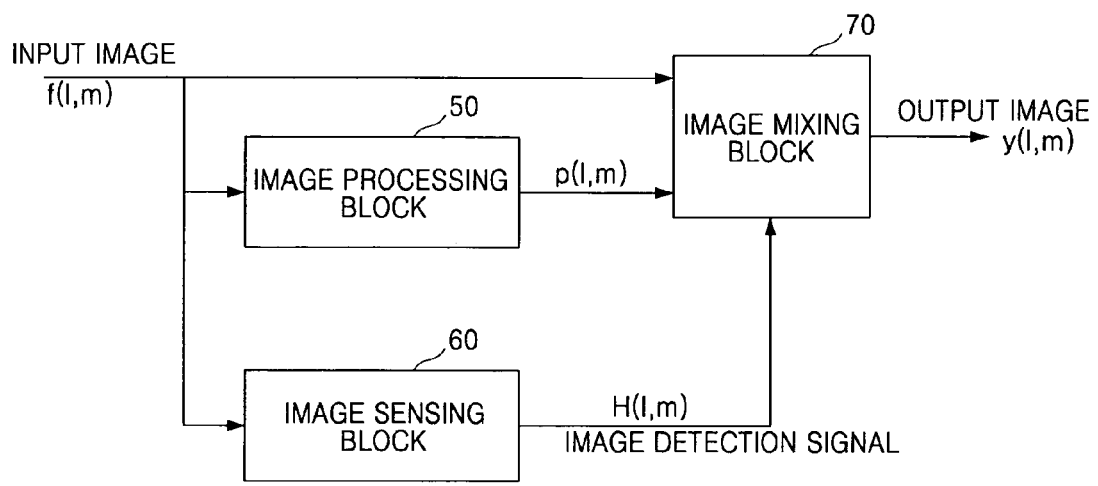
FIG. 13 is a block diagram of a real application using a statistical image processing system and method for detecting an image/noise feature according to some embodiments of the present invention.

FIG. 13 is a block diagram of a real application using a statistical image processing system and method for detecting an image/noise feature according to some embodiments of the present invention. In FIG. 13, f(l,m) and p(l,m) respectively indicate an input image signal and an output signal of an image processing block 50 and y(l,m) indicates a final output signal adjusted according to an image detection signal. The image processing block 50 performs normal image processing used in image enhancement. An image sensing block 60 outputs the amount of image feature in the input image signal using the above-described hypothesis test. The image sensing block 60 may correspond to the statistical image processing system illustrated in FIG. 3. An output signal of the image sensing block 60, i.e., an image detection signal H(l,m) may be used for sharpness enhancement, smoothing, noise reduction, deinterlacing, contrast enhancement, etc. An image mixing block 70 mixes the input image signal f(l,m) and the processed image p(l,m) according to the image detection signal H(l,m) output from the image sensing block 60. In other words, the original image f(l,m) and the result image p(l,m) of image processing are appropriately mixed based on the hypothesis test result H(l,m) output from the image sensing block 60 according to the purpose of entire image processing to obtain the final result image y(l,m). The linear or non-linear method defined by Equation (18), (19), or (20) may be used as the mixing method according to an entire purpose.

According to some embodiments of the present invention, existence/non-existence of an image/noise feature in an input image can be accurately detected regardless of the magnitude of a sample variance of pixel data in the input image. In addition, the relative amount of noise and/or image feature can be numerically expressed and can be used in the various fields of image processing application.

While the present invention has been shown and described with reference to exemplary embodiments thereof, it will be understood by those of ordinary skill in the art that various changes in form and detail may be made herein without departing from the spirit and scope of the present invention, as defined by the following claims.

What is claimed is:

1. An image sensing block of a statistical image processing system for detecting an image/noise feature, the image sensing block comprising:
   a partial image extraction unit configured to extract a partial image surrounding a particular pixel in an input image;
   an image correlation estimation unit, recorded on a non-transitory computer-readable medium, configured to obtain a direction coherence with respect to each of a plurality of predetermined direction using a correlation between pixel values in the partial image;
   an independence estimation unit configured to obtain a test statistic by numerically expressing similarity between a plurality of direction coherences obtained by the image correlation estimation unit; and
   a statistical hypothesis test unit configured to compare the test statistic obtained by the independence estimation unit with at least one predetermined image/noise limit and to obtain an image/noise detection value indicating an amount of image/noise feature in the partial image.

2. The system of claim 1, wherein each of the plurality of direction coherences is set based on differences between adjacent pixel values which are arranged in each of the plurality of directions in the partial image.

3. The system of claim 1, wherein each of the plurality of direction coherences is set based on differences between pixels in the partial image and respective pixels apart from the pixels, respectively, in the partial image by a predetermined distance defined by a row and a column.

4. The system of claim 1, wherein the image/noise detection value is set to a first setting value when the test statistic is at least a first image/noise limit, is set to a second setting value when the test statistic does not exceed a second image/noise limit, and is set to a function of the test statistic, which has a value between the first setting value and the second setting value, when the test statistic is between the first image/noise limit and the second image/noise limit.

5. A statistical image processing method for detecting an image/noise feature, the method comprising:
   extracting a partial image surrounding a particular pixel in an input image;
   obtaining, in an image sensing block of a statistical image processing system, a direction coherence with respect to each of a plurality of predetermined direction using a correlation between pixel values in the partial image;
   obtaining, in the image sensing block of the statistical image processing system, a test statistic by numerically expressing similarity between a plurality of direction coherences; and
   obtaining, in the image sensing block of the statistical image processing system, an image/noise detection value indicating an amount of image/noise feature in the partial image by comparing the test statistic with at least one predetermined image/noise limit wherein the statistical image processing system includes a processor.

6. The method of claim 5, wherein obtaining the direction coherence comprises:

arranging pixels values in the partial image on a line along a predetermined direction; and defining the direction coherence based on a function having as a factor a difference $Z_i^\theta$ between adjacent pixel values, which is expressed by $z_i^\theta = u_i^\theta - u_{i-1}^\theta$ or $z_i^\theta = |u_i^\theta - u_{i-1}^\theta|$ where "$\theta$" indicates an angle of a direction in which all pixel values in the partial image are read and "$u_i^\theta$" indicates an i-th pixel value when the pixel values in the partial image are sequentially read at the direction angle $\theta$.

7. The method of claim 6, wherein, when all pixels in the partial image are arranged in an N×N matrix, the direction coherence is defined by one of the following equations:

$$V_\theta = \frac{1}{N^2-1} \sum_{i=2}^{N^2} (z_i^\theta)^2,$$

$$V_\theta = \frac{1}{N^2-1} \sum_{i=2}^{N^2} |z_i^\theta|,$$

$$V_\theta = \frac{1}{N^2-1} \sum_{i=2}^{N^2} (z_i^\theta - \bar{z})^2, \bar{z} = \frac{1}{N^2-1} \sum_{i=2}^{N^2} z_i^\theta,$$

$$V_\theta = \frac{1}{N^2-1} \sum_{i=2}^{N^2} ([z_i^\theta]^2 - \bar{z})^2, \bar{z} = \frac{1}{N^2-1} \sum_{i=2}^{N^2} z_i^\theta, \text{ and}$$

$$V_\theta = \frac{1}{N^2-1} \sum_{i=2}^{N^2} (|z_i^\theta| - \bar{z})^2, \bar{z} = \frac{1}{N^2-1} \sum_{i=2}^{N^2} z_i^\theta.$$

8. The method of claim 5, wherein obtaining the direction coherence comprises:

defining a second partial image comprising pixels respectively apart from all pixels in the partial image, which corresponds to a first partial image, by a predetermined distance defined by a row and a column; and defining the direction coherence based on a function having as a factor a difference $z_{i,j}^\theta$ between a pixel value in the first partial image and a corresponding pixel in the second partial image, which is expressed by one of the following equations:

$$z_{i,j}^\theta = x_{i,j}(l, m) - x_{i,j}(l + \Delta_l, m + \Delta_m), \theta = \tan^{-1}\left(\frac{\Delta_l}{\Delta_m}\right),$$

and $$z_{i,j}^\theta = |x_{i,j}(l, m) - x_{i,j}(l + \Delta_l, m + \Delta_m)|, \theta = \tan^{-1}\left(\frac{\Delta_l}{\Delta_m}\right),$$

where $x_{i,j}(l,m)$ indicates a pixel value on an i-th row and a j-th column in the first partial image and $x_{i,j}(l+\Delta_l, m+\Delta_m)$ indicates a pixel value on an i-th row and a j-th column in the second partial image apart from the first partial image by $\Delta_l$ rows and $\Delta_m$ columns.

9. The method of claim 8, wherein, when all pixels in the partial image are arranged in an N×N matrix, the direction coherence is defined by one of the following equations:

$$V_\theta(l, m) = \frac{1}{N^2} \sum_{i=1}^{N} \sum_{j=1}^{N} (z_{i,j}^\theta)^2,$$

$$V_\theta(l, m) = \frac{1}{N^2} \sum_{i=1}^{N} \sum_{j=1}^{N} |z_{i,j}^\theta|,$$

$$V_\theta(l, m) = \frac{1}{N^2} \sum_{i=1}^{N} \sum_{j=1}^{N} (z_{i,j}^\theta - \bar{z})^2, \bar{z} = \frac{1}{N^2} \sum_{i=1}^{N} \sum_{j=1}^{N} z_{i,j}^\theta,$$

$$V_\theta(l, m) = \frac{1}{N^2} \sum_{i=1}^{N} \sum_{j=1}^{N} ([z_{i,j}^\theta]^2 - \bar{z})^2, \bar{z} = \frac{1}{N^2} \sum_{i=1}^{N} \sum_{j=1}^{N} z_{i,j}^\theta, \text{ and}$$

$$V_\theta(l, m) = \frac{1}{N^2} \sum_{i=1}^{N} \sum_{j=1}^{N} (|z_{i,j}^\theta| - \bar{z})^2, \bar{z} = \frac{1}{N^2} \sum_{i=1}^{N} \sum_{j=1}^{N} z_{i,j}^\theta.$$

10. The method of claim 5, wherein obtaining the image/noise detection value comprises:

setting the image/noise detection value to a first setting value when the test statistic is at least a first image/noise limit;

setting the image/noise detection value to a second setting value when the test statistic does not exceed a second image/noise limit; and setting the image/noise detection value to a function of the test statistic, which has a value between the first setting value and the second setting value, when the test statistic is between the first image/noise limit and the second image/noise limit.

11. The method of claim 10, wherein the image/noise detection value is given by:

$$H(l, m) = \begin{cases} 0, & \text{if } z < \beta_0 \\ \frac{z - \beta_0}{\beta_1 - \beta_0}, & \text{if } \beta_0 \leq z \leq \beta_1 \\ 1, & \text{if } z > \beta_1, \end{cases}$$

where H(l,m) denotes the image/noise detection value for a pixel positioned on an l-th row and an m-th column in an entire image, Z denotes the test statistic, $\beta_1$ denotes the first image/noise limit, and $\beta_0$ denotes the second image/noise limit.

12. The method of claim 10, wherein the image/noise detection value is given by:

$$H(l, m) = \begin{cases} 0, & \text{if } z < \beta_0 \\ \left(\frac{z - \beta_0}{\beta_1 - \beta_0}\right)^2, & \text{if } \beta_0 \leq z \leq \beta_1 \\ 1, & \text{if } z > \beta_1, \end{cases}$$

where H(l,m) denotes the image/noise detection value for a pixel positioned on an l-th row and an m-th column in an entire image, Z denotes the test statistic, $\beta_1$ denotes the first image/noise limit, and $\beta_0$ denotes the second image/noise limit.

13. The method of claim 10, wherein the image/noise detection value is given by:

$$H(l, m) = \begin{cases} 0, & \text{if } z < \beta_0 \\ 1 - \left(\dfrac{z - \beta_1}{\beta_1 - \beta_0}\right)^2, & \text{if } \beta_0 \le z \le \beta_1 \\ 1, & \text{if } z > \beta_1, \end{cases}$$

where H(l,m) denotes the image/noise detection value for a pixel positioned on an l-th row and an m-th column in an entire image, Z denotes the test statistic, $\beta_1$ denotes the first image/noise limit, and $\beta_0$ denotes the second image/noise limit.

14. The method of claim 10, wherein the first image/noise limit $\beta_1$ has a value of z, at which a distribution of a probability density function h(z) obtained when the test statistic is greater than a predetermined value occupies less than a ratio of $a_l$ in an entire range defined by the probability density function h(z), where the probability density function h(z) is obtained with respect to the test statistic when the plurality of direction coherences are independent of each other and comply with chi-square distribution having a certain degree of freedom.

15. The method of claim 10, wherein the second image/noise limit $\beta_0$ has a value of z, at which a distribution of a probability density function h(z) obtained when the test statistic is less than a predetermined value occupies less than a ratio of $\alpha_0$ in an entire range defined by the probability density function h(z), where the probability density function h(z) is obtained with respect to the test statistic when the plurality of direction coherences are independent of each other and comply with chi-square distribution having a certain degree of freedom.

16. The method of claim 5, wherein the test statistic is given by:

$$Z = \frac{\max\{V_1, V_2, \cdots, V_P\}}{\min\{V_1, V_2, \cdots, V_P\}},$$

where $V_1, V_2, \ldots, V_P$ respectively denote direction coherences with respect to P directions, respectively, in the partial image, $\max\{V_1, V_2, \ldots, V_P\}$ denotes a maximum value of the direction coherences, and $\min\{V_1, V_2, \ldots, V_P\}$ denotes a minimum value of the direction coherences.

17. The method of claim 5, wherein the test statistic is given by:

$$Z = \frac{X_j}{X_i},$$

where $X_i$ denotes an i-th minimum value of the direction coherences with respect to the P directions in the partial image and $x_j$ denotes a j-th minimum value of the direction coherences.

18. The method of claim 5, wherein the test statistic is given by:

$$Z = \frac{X_P + X_{P-1}}{X_1 + X_2},$$

where $X_1$ denotes a first minimum value of the direction coherences with respect to P directions in the partial image, $X_2$ denotes a second minimum value of the direction coherences, $X_P$ denotes a first maximum value of the direction coherences, and $X_{P-1}$ denotes a second maximum value of the direction coherences.

19. A non-transitory computer-readable medium including program segments for causing, when executed on a image sensing block of a statistical image processing system, the image sensing block to implement the method of claim 5.

20. An image sensing block of a statistical image processing system for detecting an image/noise feature, the image sensing block comprising:
  a partial image extraction unit configured to extract a partial image surrounding a particular pixel in an input image;
  an image correlation estimation unit configured to obtain a direction coherence with respect to each of a plurality of predetermined direction using a correlation between pixel values in the partial image;
  an independence estimation unit, recorded on a non-transitory computer-readable medium, configured to obtain a test statistic by numerically expressing similarity between a plurality of direction coherences obtained by the image correlation estimation unit; and
  a statistical hypothesis test unit configured to compare the test statistic obtained by the independence estimation unit with at least one predetermined image/noise limit and to obtain an image/noise detection value indicating an amount of image/noise feature in the partial image.

* * * * *